US010880908B2

(12) United States Patent
Jiang et al.

(10) Patent No.: US 10,880,908 B2
(45) Date of Patent: Dec. 29, 2020

(54) METHODS AND APPARATUSES FOR PERFORMING UPLINK SCHEDULING AND UL TRANSMISSION

(71) Applicant: NEC CORPORATION, Tokyo (JP)

(72) Inventors: Lei Jiang, Beijing (CN); Hongmei Liu, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/758,962

(22) PCT Filed: Feb. 2, 2016

(86) PCT No.: PCT/CN2016/073216
§ 371 (c)(1),
(2) Date: Mar. 9, 2018

(87) PCT Pub. No.: WO2017/132840
PCT Pub. Date: Aug. 10, 2017

(65) Prior Publication Data
US 2018/0324825 A1 Nov. 8, 2018

(51) Int. Cl.
H04J 3/16 (2006.01)
H04W 72/12 (2009.01)
(Continued)

(52) U.S. Cl.
CPC ..... *H04W 72/1215* (2013.01); *H04W 72/042* (2013.01); *H04W 72/1284* (2013.01);
(Continued)

(58) Field of Classification Search
None
See application file for complete search history.

(56) References Cited

U.S. PATENT DOCUMENTS

2014/0233541 A1 8/2014 Kim et al.
2014/0307567 A1 10/2014 Li et al.
(Continued)

FOREIGN PATENT DOCUMENTS

CN 103384192 A 11/2013
CN 103891182 A 6/2014
(Continued)

OTHER PUBLICATIONS

U.S. Appl. No. 62/264,226; Ye, "Multi-Subframe Scheduling for UL transmission in Unlicensed Spectrum". Dec. 5, 2015 (Year: 2015).*
(Continued)

Primary Examiner — Kwang B Yao
Assistant Examiner — Juvena W Loo
(74) Attorney, Agent, or Firm — Sughrue Mion, PLLC

(57) ABSTRACT

Embodiments of the present disclosure relate to a method and apparatus for performing UL scheduling and a method and apparatus for perform UL transmission. In an embodiment of the present disclosure, the method of performing UL scheduling comprises determining at least two modes for the UL scheduling based on the number of downlink (DL) subframes and the number of UL subframes, wherein the at least two modes indicate different scheduling time delays.

12 Claims, 13 Drawing Sheets

(51) Int. Cl.
  *H04W 72/04*     (2009.01)
  *H04W 74/08*     (2009.01)
  *H04W 16/14*     (2009.01)

(52) U.S. Cl.
  CPC ... *H04W 72/1289* (2013.01); *H04W 72/1294* (2013.01); *H04W 74/0816* (2013.01); *H04W 16/14* (2013.01)

(56) References Cited

U.S. PATENT DOCUMENTS

| | | | |
|---|---|---|---|
| 2015/0003425 A1 | 1/2015 | Kim et al. | |
| 2016/0302226 A1* | 10/2016 | Kim | H04W 72/1289 |
| 2017/0048880 A1* | 2/2017 | Anderson | H04W 72/1226 |
| 2017/0373780 A1* | 12/2017 | Ahn | H04W 72/14 |
| 2018/0007710 A1* | 1/2018 | Tanaka | H04W 72/042 |
| 2018/0092128 A1* | 3/2018 | Um | H04W 74/0808 |
| 2018/0167161 A1* | 6/2018 | Davydov | H04L 1/0001 |
| 2018/0242353 A1* | 8/2018 | Lei | H04W 72/1289 |
| 2018/0332478 A1* | 11/2018 | Noh | H04L 1/18 |
| 2018/0352564 A1* | 12/2018 | Ye | H04L 5/0053 |
| 2018/0367282 A1* | 12/2018 | Li | H04L 1/1896 |
| 2019/0014591 A1* | 1/2019 | Lei | H04W 72/1289 |

FOREIGN PATENT DOCUMENTS

| | | |
|---|---|---|
| CN | 104080161 A | 10/2014 |
| CN | 104104483 A | 10/2014 |
| CN | 104104486 A | 10/2014 |
| KR | 10-2012-0132911 A | 12/2012 |
| WO | 2015/042835 A1 | 4/2015 |

OTHER PUBLICATIONS

Written Opinion of the International Searching Authority of PCT/CN2016/073216 dated Oct. 28, 2016.
International Search Report of PCT/CN2016/073216 dated Oct. 28, 2016.
Communication dated Jul. 22, 2019, issued by the Korean Intellectual Property Office in corresponding Korean Application No.10-2018-7007024.
CMCC, "Discussion on issues related to UL channel access for LAA", 3GPP TSG RAN WG1 Meeting #82bis, Oct. 5-9, 2015, R1-155785, total 4 pages.
InterDigital Communications, "On Scheduling and HARQ operation for LAA", 3GPP TSG-RAN WG1 Meeting #81, May 25-29, 2015, R1-153144, pp. 1-3.
Nokia Networks, "On DL/UL burst and subframe indication for LAA", 3GPP TSG RAN WG1 Meeting #83, Nov. 15-22, 2015, R1-157133, pp. 2-7 (total 6 pages).
Cisco Systems, "Uplink Channel Access for LAA", 3GPP TSG RAN WG1 #82, Aug. 24-28, 2015, R1-153844, pp. 2-6 (total 5 pages).
Communication dated Feb. 12, 2019 from European Patent Office in counterpart EP Application No. 16888665.3.
Communication dated Feb. 26, 2019 from Japanese Patent Office in counterpart JP Application No. 2018-519901.
Communication dated Aug. 6, 2019, from the Japanese Patent Office in counterpart application No. 2018-519901.
Japanese Office Action issued in Japanese application No. 2018-519901; pp. 12; Office action dated Jun. 4, 2019.
Motorola Mobility, Further Discussions on Physical Layer options for LAA-LTE; 3GPP TSG RAN WG1 #81; R1-153183 [online], [retrieved on May 23, 2019], Retrieved from the Internet: <URL: http://www.3gpp.org/ftp/tsg_ran/WG1_RL1/TSGR1_81/Docs/R1-153183.zip>, May 16, 2015, pp. 1-7.
Communication dated Feb. 4, 2020, from the European Patent Office in application No. 16888665.3.
Communication dated Jan. 30, 2020, from the Korean Intellectual Patent Office in application No. 10-2018-7007024.
Communication dated May 12, 2020, from the Japanese Patent Office in Application No. 2018-519901.
Communication dated May 13, 2020, from the Intellectual Property Office of India in Application No. 201817009720.
Communication dated Aug. 4, 2020 from the Patent Office of the P.R.C. in CN Application No. 201680055117.7.
Communication dated Sep. 14, 2020 from European Patent Office in EP Application No. 16888665.3.
Communication dated Sep. 15, 2020 from Japanese Patent Office in JP Application No. 2018-519901.

\* cited by examiner

METHODS AND APPARATUSES FOR PERFORMING UPLINK SCHEDULING AND UL TRANSMISSION

CROSS REFERENCE TO RELATED APPLICATIONS

This application is a National Stage of International Application No. PCT/CN2016/073216 filed Feb. 2, 2016.

FIELD OF THE INVENTION

Embodiments of the present disclosure generally relate to wireless communication techniques, and more particularly relate to a method and apparatus for performing uplink (UL) scheduling and a method and apparatus for performing UL transmission.

BACKGROUND OF THE INVENTION

In 3rd Generation Partnership Project (3GPP), the network structure and various technologies needed for a terminal's movement between a 3GPP wireless communication network and a Wireless Local Area Network (WLAN) network are called interworking WLAN. The multi-mode wireless communication technology has evolved to use multiple wireless communication technologies at the same time. The use of multiple wireless communication technologies simultaneously thereby increases transfer rates per unit time or improves the reliability of the terminal.

In wireless communication, the spectrum is very rare resource. A licensed band represents a frequency band that is exclusively licensed to a specific operator to provide specific wireless services. On the other hand, an unlicensed band represents a frequency band that is not allocated to a specific operator, but is opened so that all entities meeting the predefined requirements may use the frequency band.

In some regions in the world, unlicensed band technologies need to abide to certain regulations, for example, Listen-Before-Talk (LBT), and channel bandwidth occupancy requirements. LBT results in an uncertainty of channel availability. For instance, an unlicensed band may be available at any time during a subframe.

The License Assisted Access (LAA) is already proposed to use unlicensed band and it became one of technologies in Long Term Evolvement-Advanced (LTE-A). In Long term evolvement (LTE) systems, UL transmission is controlled by an evolved node B (eNB); in other word, UE will transmit signals according to a UL grant from the eNB. Thus, there is a time delay between the UL data transmission and UL grant transmission. In view of the foregoing and uncertain downlink (DL) and UL burst lengths, there might be no enough DL subframes to send the UL grants for the UL transmission if legacy schemes for UL transmission are used.

SUMMARY OF THE INVENTION

In the present disclosure, there is provided a new solution for UL scheduling and UL transmission to mitigate or at least alleviate at least part of the issues in the prior art.

According to a first aspect of the present disclosure, there is provided a method of performing the UL scheduling. The method may comprise determining at least two modes for the UL scheduling based on the number of downlink (DL) subframes and the number of UL subframes, wherein the at least two modes indicate different scheduling time delay.

According to a second aspect of the present disclosure, there is provided a method of performing UL transmission. The method may comprise performing a UL transmission based on a scheduling mode for a UL scheduling, wherein the scheduling mode is a predetermined scheduling mode or a scheduling mode indicated in a UL scheduling mode indication.

According to a third aspect of the present disclosure, there is also provided an apparatus for performing the UL scheduling. The apparatus may comprise a scheduling mode determination unit, configured to determine at least two modes for the UL scheduling based on the number of downlink (DL) subframes and the number of UL subframes, wherein the at least two modes indicate different scheduling time delay.

In a fourth aspect of the present disclosure, there is provided an apparatus for performing UL transmission. The apparatus may comprise a UL transmission performing unit, configured to perform the UL transmission based on a scheduling mode for a UL scheduling, wherein the scheduling mode is a predetermined scheduling mode or a scheduling mode indicated in a UL scheduling mode indication.

According to a fifth aspect of the present disclosure, there is also provided a computer-readable storage media with computer program code embodied thereon, the computer program code configured to, when executed, cause an apparatus to perform actions in the method according to any embodiment in the first aspect.

According to a sixth aspect of the present disclosure, there is further provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

Other features and advantages of the embodiments of the present invention will also be apparent from the following description of specific embodiments when read in conjunction with the accompanying drawings, which illustrate, by way of example, the principles of embodiments of the invention

BRIEF DESCRIPTION OF THE DRAWINGS

Embodiments of the invention are presented in the sense of examples and their advantages are explained in greater detail below, with reference to the accompanying drawings, where FIG. 1 schematically illustrates a flow chart of a method 100 of performing UL scheduling in accordance with an embodiment of the present disclosure.

DETAILED DESCRIPTION OF EMBODIMENTS

Figure 1:
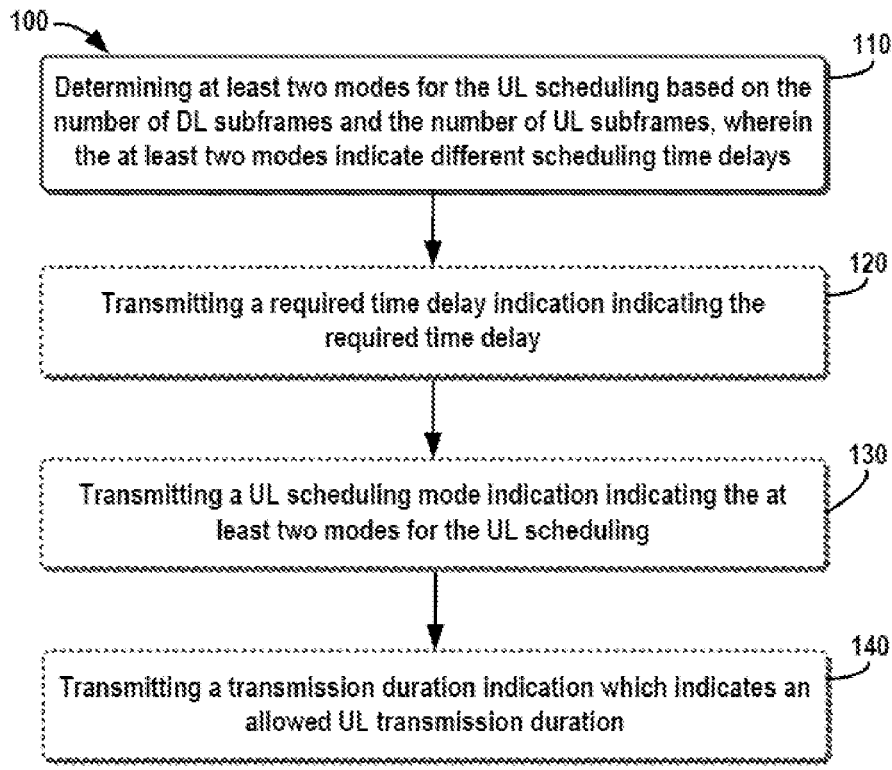

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

Embodiments of the present disclosure are directed to a new solution for UL scheduling and UL transmission. The solution can be performed between a serving node like eNB and a terminal device like UE so as to support a flexible UL scheduling time. Particularly, the serving node can determine at least two modes for the UL scheduling based on the number of downlink (DL) subframes and the number of UL subframes, wherein the at least two modes indicate different scheduling time delays; and the eNB may optionally transmit a UL scheduling mode indication indicating the at least two modes for the UL scheduling or alternative the least two modes can be set as predetermined ones. The terminal device can perform a UL transmission based on the scheduling mode for the UL scheduling. The scheduling mode can be indicated in the UL scheduling mode indication. Or alternatively, the scheduling mode can be a predetermined one and the terminal device can estimate the scheduled UL subframes based on the predetermined one and the frame structure.

Thus, in embodiments of the present disclosure, for different DL burst length and UL burst length, the scheduling time delay can be different. At the same time, the at least two modes can be used by one single terminal device or different terminal devices together, which means one DL subframe can be used to send one or more UL grants for multiple UL subframes. In such a way, for different burst lengths, the UL subframes can be scheduled in a flexible UL scheduling scheme.

In some embodiments of the present disclosure, the UL scheduling may be uplink cellular scheduling and the UL transmission may be uplink cellular transmission. In the uplink cellular transmission, the terminal device may comprise UE, such as a terminal, an MT, an SS, a PSS, an MS, or an AT; meanwhile, the serving node may comprise a BS, such as a node B (NodeB or NB), or an evolved NodeB (eNodeB or eNB)

According to other embodiments of the present invention may be applied in various communication systems, including but not limited to a Long Term Evolution (LTE) system or a Long Term Evolution Advanced (LTE-A) system. Given the rapid development in communications, there will also be future type wireless communication technologies and systems with which the present invention may be embodied without any doubts. Thus, it should not be appreciated as limiting the scope of the invention to only the aforementioned system.

Hereinafter, some exemplary embodiments of the present invention will be described below with reference to FIGS. 1 to 24 in details. However, it shall be appreciated that these exemplary embodiments are presented only for purposes of illustration and the present disclosure is not limited to specific details described with reference to the exemplary embodiments.

It shall be first noted that in embodiments of the present disclosure, the Maximum Channel Occupancy Time (MCOT) is the limit for channel occupancy time, which can be applied for both DL and UL burst. That is to say, the total length of DL burst and UL burst should not exceed the MCOT. Or alternatively, the MCOT can also be applied to the DL burst and the UL burst separately; in other word, the MCOT can be a limit to either of DL burst and UL burst, and neither of the DL burst and UL burst shall exceed the MCOT value. In Rel. 13, the maximum value of MCOT is 10 ms, and hereinafter, it will be taken as an example, however, in the present disclosure, the time duration is not limited thereto, it can be longer or shorter and the MCOT is also possible be replaced by other different wordings such as allowed transmission duration, expected transmission duration, possible transmission duration, etc.

In addition, in the following context, for a purpose of illustration, it is assumed that there are N DL subframes in the DL burst, and M UL subframes in the UL burst, which means that N is the total number of DL subframes in the DL burst and M is the total number of the UL subframes in the UL burst. Furthermore, in the present disclosure, $n_i$ is used to indicate an index of DL subframe in a set of DL subframes used to send UL grants, $n_i=0, 1, \ldots N'-1$, wherein N' means the number of subframes in the set of DL subframes, and $1 \leq N' \leq N$; $m_i$ is the index of the UL subframe in the UL burst, $m_i=0, 1, \ldots M-1$; and $m'=\mod(M,N')$, which means a remainder by dividing M by N'. All these signs will be used throughout the present disclosure and have the meaning as just described unless explicitly indicated otherwise.

Next, Reference will be first made to FIG. 1, which schematically illustrates a flow chart of a method 100 of performing UL scheduling in accordance with an embodiment of the present disclosure. The method 100 can be performed at, or by a serving node such as eNB, or any other suitable device.

As illustrated in FIG. 1, the method 100 starts from step 110, in which at least two modes for the UL scheduling is determined based on the number of DL subframes and the number of UL subframes, wherein the at least two modes indicate different scheduling time delays.

In embodiments of the present disclosure, it is proposed to use the legacy scheduling scheme (the scheduling time is n+k, wherein n is the system subframe number and k the required time delay between the UL grant and UL transmission) if the DL burst length is equal to or longer than the UL burst length, the legacy scheduling scheme can be applied; while if the DL burst length is shorter than the UL burst length, it is proposed to use one DL subframe to send one or more UL grants for multiple UL subframes, in other words, one DL subframe can be used to scheduling multiple subframes.

In a case that the DL burst length is equal to or longer than the UL burst length, a subframe configuration with DL subframes more than the UL subframes will be used and thus, there will be enough DL subframes to send UL grants for scheduling the UL subframes. In such a case, it will do well to use the existing scheduling schemes in LTE system. That is to say, if the DL burst length is equal to or longer than the UL burst length, the legacy scheduling scheme with the scheduling time n+k can be used.

Figure 2:
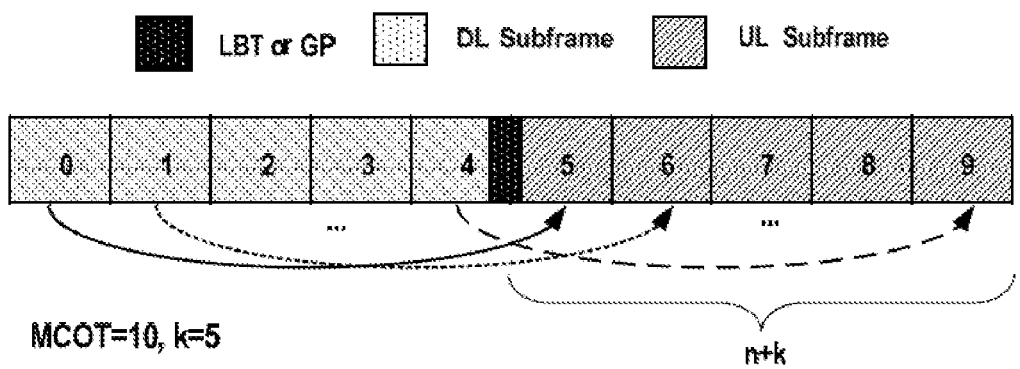
FIG. 2 schematically illustrates an example scheduling scheme in a case that the DL burst length is equal to the UL burst length in accordance with an embodiment of the present disclosure.
Figure 3:
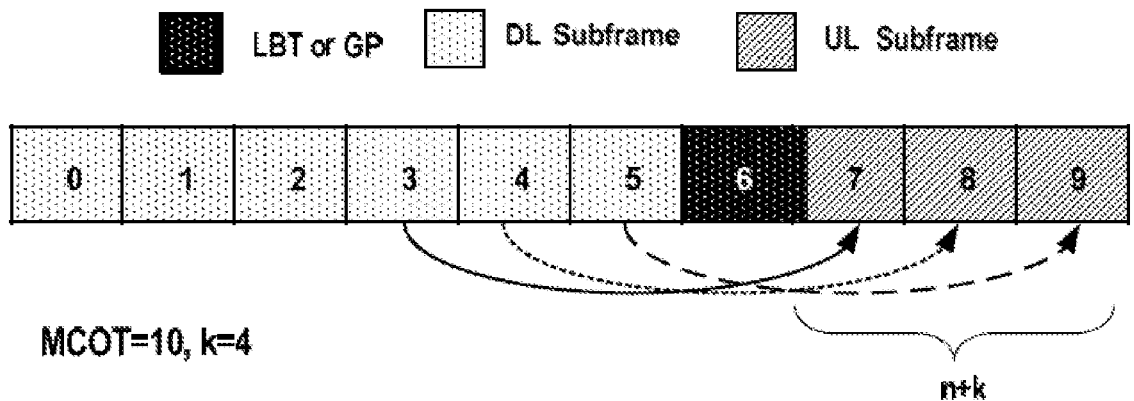
FIG. 3 schematically illustrates an example scheduling scheme in a case that the DL burst length is longer than the UL burst length in accordance with an embodiment of the present disclosure.

For a purpose of illustration, reference will be made to FIGS. 2 and 3 to describe example scheduling schemes in a case that the DL burst length is equal to or longer than the UL burst length. In FIGS. 2 and 3, the MCOT is applied for both DL and UL, which means the total length of DL burst and UL burst should not exceed the MCOT.

FIG. 2 schematically illustrates example scheduling schemes in a case that the DL burst length is equal to the UL burst length in accordance with an embodiment of the present disclosure. As illustrated in FIG. 2, there are five DL subframes and five UL subframes (i.e., the DL burst length is equal to the UL burst length), and thus each DL subframe can be used to schedule one UL subframe for a terminal device by a UL grant carried in the DL subframe. In such a case, the required time delay k between the UL grant and the UL transmission can be 5 and the scheduling mode is "n+k" so that each of the UL subframes can be scheduled.

FIG. 3 schematically illustrates another example scheduling mode in a case that the DL burst length is longer than the UL burst length in accordance with an embodiment of the present disclosure. As illustrated in FIG. 3, there are six DL subframes and three UL subframes (i.e., the DL burst length is longer than the UL burst length) and thus, there are more DL subframes than required to schedule UL subframes. In such a case, the required time delay k can be set as 4 and the scheduling mode is still "n+k" so that the UL subframes can be scheduled by the DL subframes nearest thereto to reduce the scheduling time delay as most as possible. In FIG. 3, the last three DL subframes are used to schedule the UL subframes.

It should be understood that a gap between DL transmission and UL transmission (or the gap between DL burst and UL burst) is variable, which is dependent on a used LBT scheme. For example, in FIG. 2, the gap is illustrated as a short gap which is much smaller than one subframe, while in FIG. 3, a gap between DL transmission and UL transmission is illustrated to be longer than one subframe. For the case as illustrated in FIG. 3, if the gap is smaller, for example, like the gap illustrated in FIG. 2, k can be set as smaller one, for example 3.

It should also be noted that scheduling schemes described with reference to FIGS. 2 and 3 can also be applied to other cases with different MCOT and/or different k values and the skilled in the art can achieve changes to the scheduling schemes from the teachings provided herein and thus detailed description will be omitted.

In addition, it can also be seen that the required time delay k can also be a variable value instead of a fixed one. That is to say, unlike the fixed value of 4 in the existing LTE system, the value of k can be equal to 4, smaller than 4 or larger than 4. In other words, the required time delay k and thus the scheduling delay time can be different for different DL/UL configuration patterns. For example, the required time delay k can be a variable value which is determined based on the subframe structure to be used, and particularly, the number of downlink DL subframes and the number of UL subframes.

Taking the LTE TDD system as an example, there are seven different subframe structures or patterns of uplink/downlink UL/DL configurations, i.e., configurations 0 through 6. For each of configuration patterns, it has a different ratio of DL subframes to UL subframes and which one configuration pattern will be used in data transmission is to be determined based on DL/UL traffic conditions. In a case that a certain configuration pattern is selected, the required time delay k can be set based thereon and thus the k value is not fixed and it can change based on the used subframe configuration pattern or additionally based on the gap between the DL grant and the UL transmission if the gap needs to be considered.

In such a case, in step 120 in FIG. 1, a required time delay indication can be transmitted to a terminal device to indicate the required time delay as illustrated. The required time delay indication can be transmitted periodically, or transmitted only if the k value is changed. The required time delay can be transmitted in various ways, for example by using RRC signals, or bits in DCI format.

It is to be understood that although the variable k is described herein with reference to FIGS. 2 and 3 but it does not means that it is not applicable to other scheduling schemes; instead, it can be applied with any scheduling schemes as described in the present disclosure, for example those to be described with reference to FIGS. 4 to 20.

On the other hand, if the DL burst length is shorter than the UL burst length, one DL subframe can be used to send one or more UL grants for multiple UL subframes. That is to say, multiple UL subframes can be scheduled to different terminal devices or be scheduled to one terminal device. In other words, the determined scheduling modes can be used by different terminal devices or by one single terminal device to schedule multiple UL subframes. In such a way, all UL subframes can still be scheduled by means of DL subframes even if there are not enough DL subframes.

As mentioned hereinbefore, at least two modes for the UL scheduling indicate different scheduling time delays and can be determined based on the number of downlink (DL) subframes and the number of UL subframes. Particularly, the different scheduling time delays can be determined at least based on the required time delay k between a UL grant and the UL transmission.

In embodiments of the present disclosure, the multiple scheduling modes can be determined so that subframes in the UL transmission are scheduled as most as possible. For example, the different scheduling delay times can be selected from any of: a required time delay between a UL grant and the UL transmission; a multiple of the required time delay; the required time delay and a predetermined extension value; another multiple of the required time delay; a multiple of the required time delay and a predetermined extension time value; and a combination of time delays, which comprises a required time delay and two or more variable extension values.

Next, as illustrated in FIG. 1, in step 130, optionally, a UL scheduling mode indication can be transmitted to a terminal device to indicate the at least two modes for the UL scheduling. In addition, if the scheduling modes are determined as predetermined ones and the terminal device can estimate the scheduled UL subframes based on the frame structure and the predetermined modes. In such a case, no mode indication is needed.

The UL scheduling mode indication can be transmitted in any suitable ways. For example, it may be transmitted by reusing a UL index in downlink control information (DCI) format, for example UL index in DCI format 0/4. For example, "MSB=1" and "LSB=0" in the DCI format was used to indicate the scheduling mode "n+k" and now the two bits can be reused. Additionally, it may also be transmitted by using additional bits in the DCI format.

For purposes of illustration, reference will be made to FIGS. 4 to 11 to describe various example scheduling schemes that can be used in embodiments of the present disclosure, wherein the MCOT is applied for both DL and UL, which means the total length of DL burst and UL burst should not exceed the MCOT. In these figures, FIGS. 4 to 7 illustrate example scheduling schemes in which different scheduling modes can be used by different terminal devices and FIGS. 8 to 11 illustrate example scheduling schemes which supports the multi-subframe scheduling, i.e., different scheduling modes can be used by one single terminal device. It shall be understood that in these figures, a short gap between the DL transmission and the UL transmission is illustrated for simplify the illustration but the present disclosure is not limited thereto.

First, reference is made to FIGS. 4 to 7 to describe scheduling schemes in which different scheduling modes are used by different terminal device.

Figure 4:
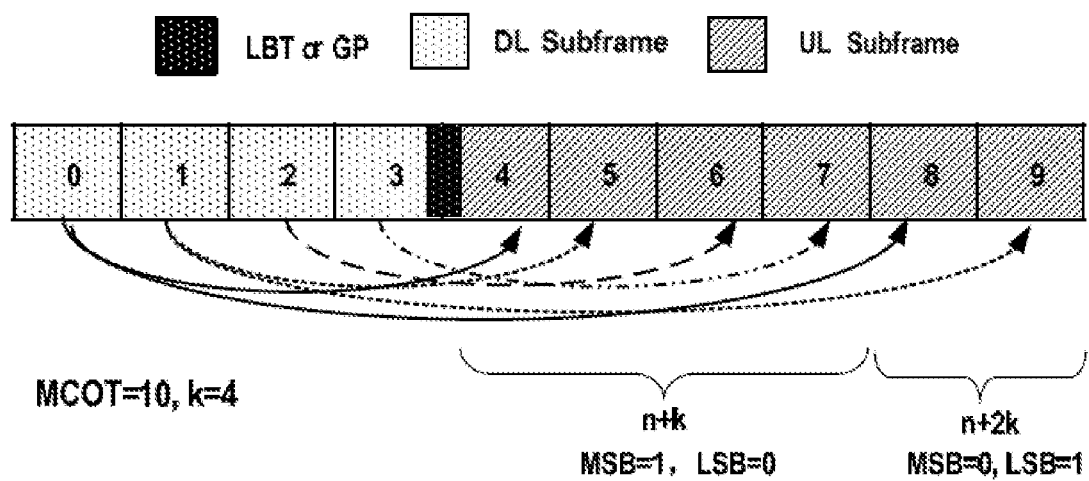
FIG. 4 schematically illustrates an example scheduling scheme in a case that the DL burst length is shorter than the UL burst length in accordance with an embodiment of the present disclosure.

Referring to FIG. 4, FIG. 4 schematically illustrates an example scheduling scheme in a case that the DL burst length is shorter than the UL burst length in accordance with an embodiment of the present disclosure. As illustrated in FIG. 4, there are four DL subframes in the DL burst and six UL subframes in the UL burst, wherein MCOT=10 and k=4. In such a case, all the DL subframes can be used to send UL grants so that all UL subframes can be scheduled, in other word, N'=N=4. In the scheduling scheme, there are two scheduling modes, i.e., "n+k" and "n+2k", wherein a first scheduling delay time is the required time delay k and the other scheduling delay time is a multiple of the required time delay k. The scheduling mode "n+k" can be used by a first terminal device and be indicated by "MSB=1, LSB=0" and the scheduling mode "n+2k" can be used by a second terminal device and be indicated by "MSB=0, LSB=1," for example. Thus, in this scheduling scheme, for the first N' UL subframes, the scheduling timing is n+k, i.e., subframe 0, 1, 2, 3 are used to send UL grants for subframe 4, 5, 6 and 7; for the remaining M−N' or m' (Mod (M, N')) UL subframes, the scheduling timing is n+2k, i.e. subframes 0 and 1 are used to send UL grants for subframes 8 and 9 respectively.

It can be understood that throughout the present disclosure, scheduling modes can be indicated in any different indicators as long as each of them has a specific indicator so that different terminal devices do not use the same scheduling modes or timings. For example, for the scheduling scheme as illustrated in FIG. 4, the second scheduling mode can also be indicated by any indicator such as "MSB=1, LSB=1", "MSB=0, LSB=0," as long as it is different from that is used for the first scheduling mode.

Figure 5:
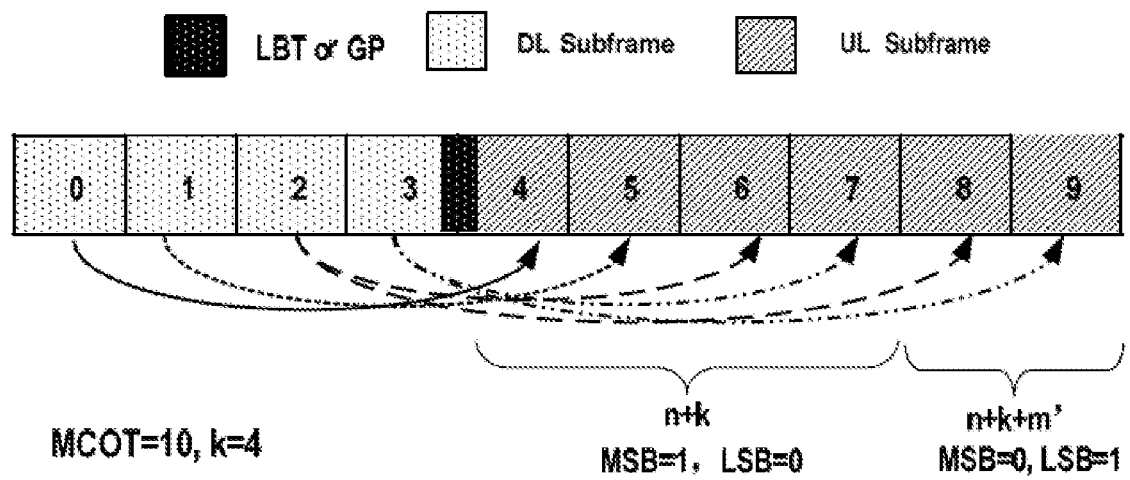
FIG. 5 schematically illustrates an example scheduling scheme in a case that the DL burst length is shorter than the UL burst length in accordance with another embodiment of the present disclosure.

Reference is next made to FIG. 5, which schematically illustrates an example scheduling scheme in a case that the DL burst length is shorter than the UL burst length in accordance with another embodiment of the present disclosure. As illustrated in FIG. 5, there are four DL subframes in the DL burst and six UL subframes in the UL burst, wherein MCOT=10 and k=4, which is similar to that in FIG. 4. In the scheduling scheme as illustrated in FIG. 5, there are also two scheduling mode, i.e., "n+k" and "n+k+m'"s, wherein a scheduling delay time is the required time delay k and the other scheduling delay time is the required time delay k and a predetermined extension value m'. Thus, the scheduling scheme of FIG. 5 differentiates from that of FIG. 4 in that the second scheduling mode n+k+m' will be used for the second terminal device to schedule the remaining M−N' or m' UL subframes instead of n+2k. In such a way, in this scheduling scheme, not subframes 0 and 1 but subframes 2 and 3 are used to send UL grants for subframes 8 and 9 (the remaining two UL subframes). That is to say, in this scheduling scheme as illustrated in FIG. 5, the two DL subframe nearest to the UL subframe will be used to send UL grants for the remaining two subframes, instead of using the first two DL subframes as illustrated in FIG. 4. Thus, it can be understood that in embodiments of the present disclosure, when the scheduling mode n+2k is used, it can also be replaced by the scheduling mode n+k+m'.

Figure 6:
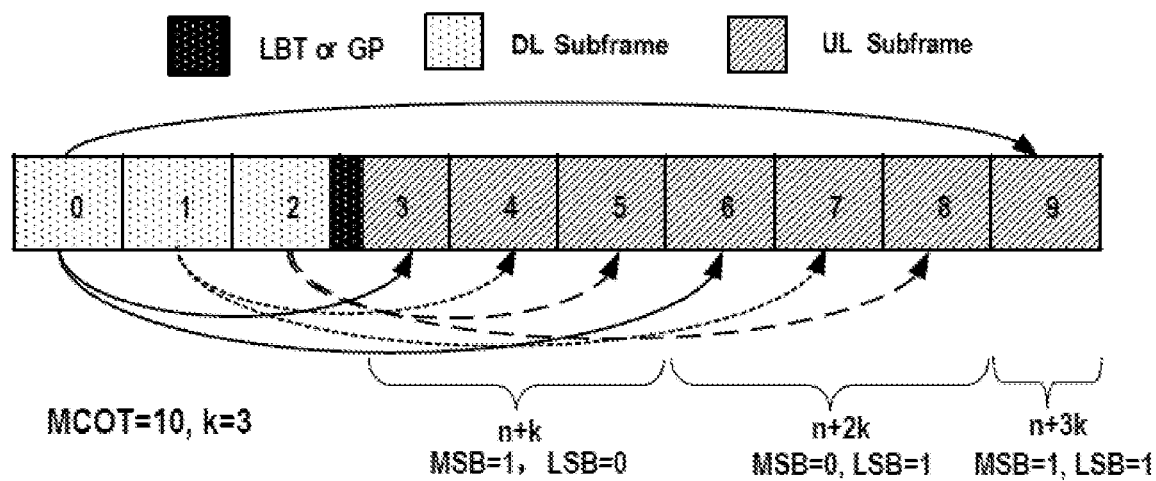
FIG. 6 schematically illustrates an example scheduling scheme in a case that the DL burst length is shorter than the UL burst length in accordance with a further embodiment of the present disclosure.

FIG. 6 schematically illustrates an example scheduling scheme in a case that the DL burst length is shorter than the UL burst length in accordance with a further embodiment of the present disclosure. As illustrated in FIG. 6, there are three DL subframes in the DL burst and seven UL subframes in the UL burst, wherein MCOT=10 and k=3. In such a case, all the DL subframes can be used to send UL grants so that all UL subframes can be scheduled, in other word, N'=N=3. In this scheduling scheme, there are three scheduling modes, i.e., "n+k," "n+2k" and "n+3k," wherein a first scheduling delay time is the required time delay k, a second scheduling delay time is a multiple of the required time delay (2k), and a third scheduling delay time is another multiple of the required time delay (3k). Thus, in addition to subframes scheduled in the two scheduling modes used in FIG. 4, the remaining m' (mod (M, N')) subframes can be further scheduled in the third scheduling mode n+3k. The scheduling mode "n+3k" can be used by a third terminal device and be indicated by for example "MSB=1, LSB=1." Thus, in this scheduling scheme, for the first N' UL subframes, the scheduling is n+k, i.e., subframe 0, 1, 2 are used to send UL grants for subframe 3, 4, 5; for the second N' UL subframes, the scheduling timing is n+2k; i.e. subframe 0, 1, 2 are used to send UL grants for subframe 6, 7, 8; for the last m' UL subframes, the scheduling timing is n+3k, i.e. subframe 0 is used send UL grant for subframe 9.

Figure 7:
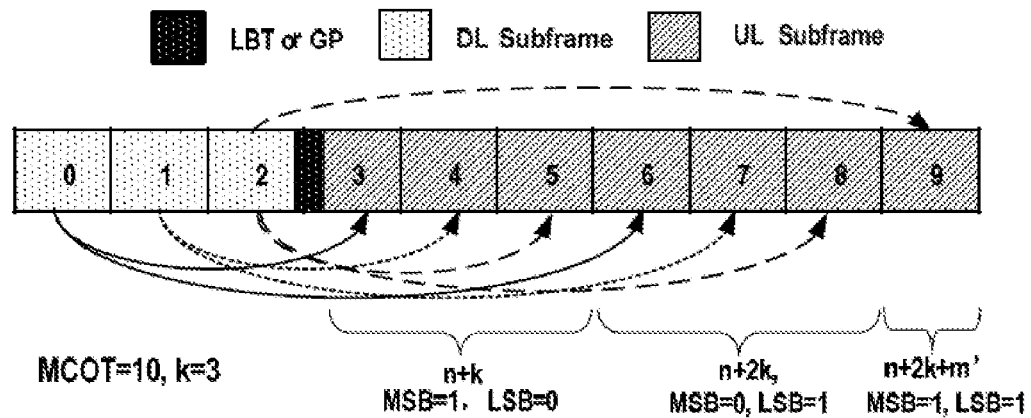
FIG. 7 schematically illustrates an example scheduling scheme in a case that the DL burst length is shorter than the UL burst length in accordance with a still further embodiment of the present disclosure.

FIG. 7 further schematically illustrates an example scheduling scheme in a case that the DL burst length is shorter than the UL burst length in accordance with a still further embodiment of the present disclosure. As illustrated in FIG. 7, there are three DL subframes in the DL burst and seven UL subframes in the UL burst, wherein MCOT=10 and k=3, which is similar to that in FIG. 6. In the scheduling scheme as illustrated in FIG. 7, there are also three scheduling mode, i.e., "n+k," "n+2k" and "n+2k+m'", wherein a first scheduling delay time is the required time delay k, a second scheduling delay time is the multiple of the required time delay and a third scheduling delay time is the multiple of the required time delay and a predetermined extension time value m'. Thus, the scheduling scheme of FIG. 7 differentiates from that in FIG. 6 in that the third scheduling mode n+2k+m' will be used to schedule the remaining m' UL subframes. In such a way, in this scheduling scheme, subframe 2 is used to send UL grant for subframe 9 (the remaining one UL subframe). Therefore, in this scheduling scheme as illustrated in FIG. 7, the DL subframe nearest to the UL subframes will be used to send UL grant for the remaining m' subframe, instead of using the first DL subframe as illustrated in FIG. 6. Thus, similar to that in FIG. 5, when the scheduling mode n+3k is used, it can also be replaced by the scheduling mode n+2k+m', similar, a scheduling modes n+4k can be replaced by n+3k+m', and so on.

Hereinafter, references are further made to FIGS. 8 to 11 to describe example scheduling schemes which support the multi-subframe scheduling. Herein, multi-subframe scheduling means a scheduling manner in which one UL grant can be used to schedule multiple UL subframes. Thus, in such a sense, the scheduling schemes described with reference to FIGS. 4 to 7 do not belong to the multi-subframe scheduling since in these scheduling schemes, different scheduling modes are used by different terminal devices by means of different UL grants. However, these scheduling schemes described with reference to FIG. 4 to 7 can also considered as the multi-subframe scheduling, in a case that the multi-subframe scheduling is defined in a more general way. For example, it may be defined as a scheduling manner in which one DL subframe can be used to schedule multiple UL subframes by means of one or more UL grants and in such a case, these scheduling schemes described with reference to FIG. 4 to 7 will belong to the multi-subframe scheduling. Thus, although the scheduling schemes described with reference to FIGS. 4 to 7 are described to not belong to the multi-subframe scheduling in some embodiments, they are just for purpose of illustration and this can be changed if the meaning of multi-subframe scheduling is extended.

Figure 8:
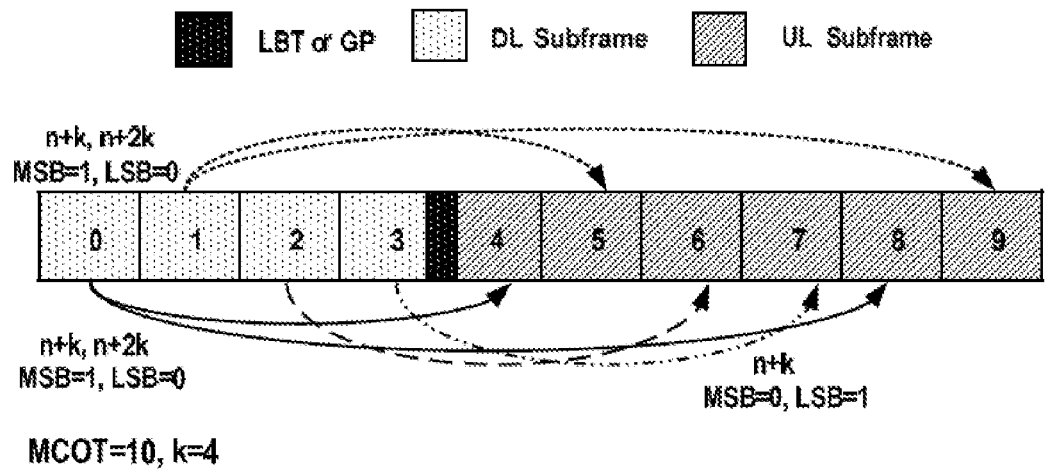
FIG. 8 schematically illustrates an example scheduling scheme in a case that the multi-subframe scheduling is enabled in accordance with an embodiment of the present disclosure.

Referring to FIG. 8, FIG. 8 schematically illustrates an example scheduling scheme in a case that the multi-subframe is enabled in accordance with an embodiment of the present disclosure. As illustrated in FIG. 8, there are four DL subframes in the DL burst and six UL subframes in the UL burst, wherein MCOT=10 and k=4. In such a case, all the DL subframes can be used to send UL grants so that all UL subframes can be scheduled, or in other word, N'=N=4. In the scheduling scheme, there are two scheduling modes, i.e., "n+k" and "n+2k". Different from those illustrated in FIG. 4, the two scheduling modes "n+k" and "n+2k" can be used by one single terminal device and be indicated by "MSB=1, LSB=0" while the scheduling mode "n+k" can be used by a terminal device and be indicated by "MSB=0, LSB=1," for example. Thus, in response to receiving indicator 10 (MSB=1, LSB=0), the terminal device will adjust corresponding PUSCH transmission in both subframes n+k and n+2k, i.e. subframe 0 is used to send UL grant for both subframes 4 and 8 and subframe 1 is used to send UL grant for both subframes 5 and 9; in response to receiving indicator 01 (MSB=0, LSB=1), the terminal device will adjust the corresponding PUSCH transmission in subframe n+k, i.e. subframe 2 is used to send UL grant for subframe 6, and subframe 3 is used to send UL grant for subframe 7.

Figure 9:
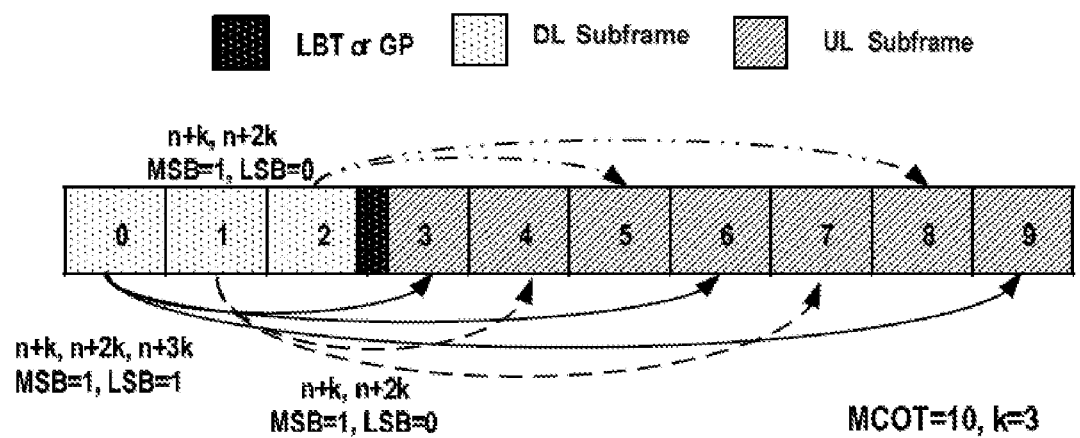
FIG. 9 schematically illustrates an example scheduling scheme in a case that the multi-subframe scheduling is enabled in accordance with another embodiment of the present disclosure.

FIG. 9 schematically illustrates an example scheduling scheme in a case that multi-subframe scheduling is enabled in accordance with another embodiment of the present disclosure. As illustrated in FIG. 9, there are three DL subframes in the DL burst and seven UL subframes in the UL burst, wherein MCOT=10 and k=3. In such a case, all the DL subframes can be used to send UL grants so that all UL subframes can be scheduled, or in other word, N'=N=3. In the scheduling scheme, there are three scheduling modes, i.e., "n+k" and "n+2k" and "n+3k". Different from those illustrated in FIG. 6, the three scheduling modes "n+k," "n+2k" and "n+3k" can be used by one single terminal device and be indicated by "MSB=1, LSB=1" and the scheduling mode "n+k" and "n+2k" can be used by one single terminal device and be indicated by "MSB=1, LSB=0," for example. Thus, in response to receiving indicator 11 (MSB=1, LSB=1), the terminal device will adjust corresponding PUSCH transmission in all of subframes n+k, n+2k and n+3k, i.e. subframe 0 is used to send UL grant for both subframes 3, 6, 9 and; in response to receiving indicator 10 (MSB=1, LSB=0), the terminal device will adjust the corresponding PUSCH transmission in both subframes n+k and n+2k, i.e. subframe 1 is used to send UL grants for subframe 4 and 7, and subframe 2 is used to send UL grants for subframes 5 and 8.

Figure 10:
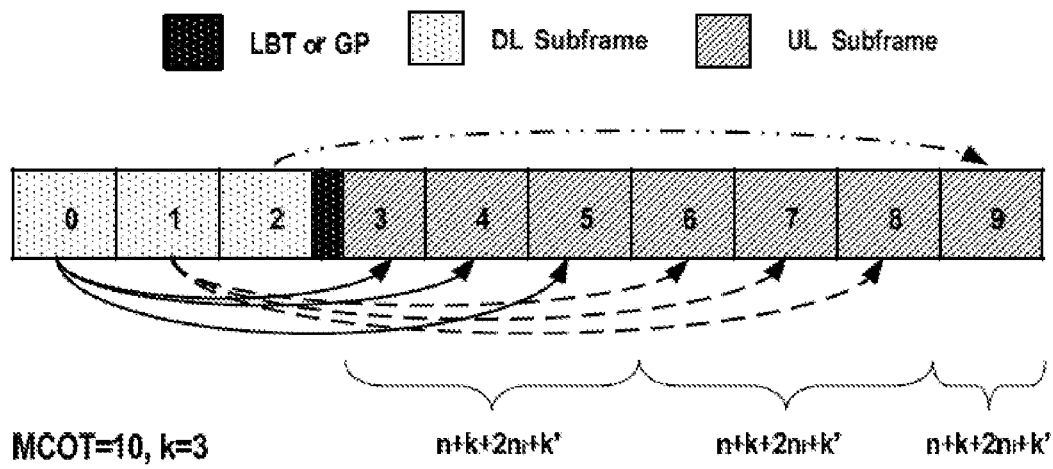
FIG. 10 schematically illustrates an example scheduling scheme in a case that the multi-subframe scheduling is enabled in accordance with a further embodiment of the present disclosure.

FIG. 10 schematically illustrates an example scheduling scheme in a case that multi-subframe scheduling is enabled in accordance with a further embodiment of the present disclosure. As illustrated in FIG. 10, there are three DL subframes in the DL burst and seven UL subframes in the UL burst, wherein MCOT=10 and k=3. In such a case, all the DL subframes can be used to send UL grants so that all UL subframes can be scheduled, or in other word, N'=N=3. In the scheduling scheme, there are a combination of time delays, which comprises a required time delay and two or more variable extension values, or in other words, there is a combination of scheduling modes. As illustrated in FIG. 10, the scheduling modes can be expressed by:

$$n+k+2n_i+k'$$

wherein k'=0, 1, . . . , floor (M/N'). The floor (M/N') means an operation of rounding down a resulting value by dividing M by N', i.e., obtaining an integral number by neglecting a decimal fraction of the resulting value.

Thus, in this scheduling scheme, the scheduling modes comprise $n+k+2n_i$, $n+k+2n_i+1$, . . . $n+k+2n_i+$floor (M/N'), which means each of DL subframes will be used to send UL grant for ceil (M/N') consecutive UL subframes. The ceil (M/N') means an operation of rounding up of a resulting value by dividing M by N', i.e., obtaining an integral number by taking a decimal fraction (not including zero) of the resulting value as one. It can be understood that the ceil (M/N') will be floor (M/N')+1 if the decimal fraction of the resulting value is not zero. Therefore, for the scheduling scheme as illustrated in FIG. 10, there are three different scheduling modes since ceil (M/N') is 3. Particularly, in the scheduling scheme, subframe 0 is used to send UL grant for subframe 3,4,5; subframe 1 is used to send UL grant for subframe 6,7,8; and subframe 2 is used to send UL grant for subframe 9.

Herein, it shall be noted that although it uses N' in "floor (M/N')" and "ceil (M/N')" and N' can also be replaced by k since k is usually equal to N' and this can also be applied to any N' described herein below.

Figure 11:
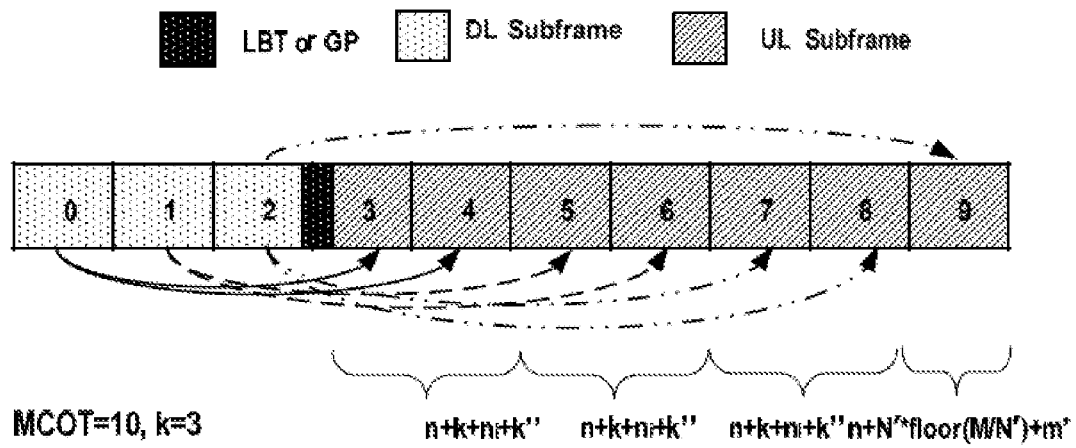
FIG. 11 schematically illustrates an example scheduling scheme in a case that the multi-subframe scheduling is enabled in accordance with a still further embodiment of the present disclosure.

FIG. 11 schematically illustrates an example scheduling scheme in a case that multi-subframe scheduling is enabled in accordance with a still further embodiment of the present disclosure. Different from the scheduling scheme as illustrated in FIG. 10, in FIG. 11, it uses a combination of scheduling modes and another scheduling mode, wherein the a combination of scheduling modes comprises floor (M/N') scheduling modes, which can be expressed by:

$$n+k+n_{il\ +k''}$$

wherein k''=0, 1, . . . , floor (M/N')−1. The remaining one can be expressed by $$n+N'^*\text{floor}(M/N')+m'$$

Thus, in this scheduling scheme, the scheduling modes comprise, $n+k+n_i$, $n+k+n_i+1$, . . . $n+k+n_i+$floor (M/N')−1, and n+k*floor(M/N')+m'. This means each of DL subframes will be used to send UL grant for floor (M/N') consecutive UL subframes and the remaining mode m' (mod(M/N')) UL subframes can be scheduled by the last m' (mod(M/N')) DL subframes. Specifically, as illustrated in FIG. 11, in the scheduling scheme, subframe 0 is used to send UL grant for subframe 3 and 4; subframe 1 is used to send UL grant for subframe 5, 6; subframe 2 is used to send UL grant for subframes 7 and 8 and the remaining subframe 9. It should be understood that it is possible to use the first m' (mod(M/N')) DL subframes to send UL grants for the remaining mode m' (mod(M/N')) UL subframes.

It shall be understood that the different scheduling modes described with reference to FIGS. 8 to 11 can be used by one single terminal device and it is also possible to be used by multiple terminal devices. In other words, unlike the scheduling schemes illustrated in FIGS. 4 to 7 in which the different scheduling modes shall be used by different terminal devices, the scheduling modes illustrated in FIGS. 8 to 11 are limited thereto. That is to say, the scheduling scheme can be used by one single terminal device and/or multiple terminal devices as long as the UL subframes can be scheduled as most as possible.

Besides, from the above-described scheduling schemes, it can be seen that usually, two bits can be used for the scheduling mode indication to indicate the different scheduling timing. This can be implemented by reusing a UL index in DCI format 0/4, or introduce two additional bits.

For the scheduling schemes described with reference to FIGS. 4 to 7, it will change least since MSB=1, LSB=0 is already used to indicate 'n+k' supported in current communication, but it is undoubted that other bits in DCI format can also be reused, or newly introduced bits can be used as an indicator for the scheduling modes.

For the scheduling schemes described with reference to FIGS. 4 to 7, it is also possible to use other combinations of the two bits, for example, indicator 00 for n+k, indicator 01 for n+2k, indicator 10 for n+3k, indicator 11 for n+4k, etc. If the last mod(M,N') UL subframes are scheduled by the last mod(M,N') DL subframes, it may use one of available indicators in the combinations to indicate it. In addition, any other combinations are also possible.

For the scheduling schemes described with reference to FIGS. 8 and 9, the two bits may be redefined so that indicator 01 (or 00) indicates scheduling timing n+k; indicator 10 (or 01) indicates the combination of n+k and n+2k; indicator 11 (or 10) indicates n+k, n+2k and n+3k. It can be understood that any other combinations are also possible.

For the scheduling schemes described with reference to FIGS. 10 and 11, no specific indication is needed for n+k+2$n_t$+k', however, if n+N'*floor(M/N')+m' is to be used, it require an indicator to differentiate n+k+$n_t$+k" and n+N'*floor(M/N')+m'. For example, indicator 10 can be used to indicate n+k+$n_t$+k', and indicator 01 can be used to indicating n+N'*floor(M/N')+m'.

In addition, the scheduling scheme can be specific to the frame structure (subframe configuration pattern). Thus, if the frame structure is fixed, the scheduling scheme is also fixed. In such a case, the terminal device can estimate the scheduled UL subframes by itself, no any indication is needed.

Hereinbefore, the scheduling schemes are described under a condition that the MCOT is applied for the total number of the DL burst and UL burst, and the gap between the DL transmission and the UL transmission is short. However, the DL burst and the UL burst can be transmitted separately and each burst can have its own MCOT. This means that the MCOT can be applied to the DL burst and the UL burst separately, or in other word, the MCOT can be a limit to either of DL burst and UL burst, and neither of the DL burst and UL burst shall exceed the MCOT value. Besides, it can also be understood that the gap between the DL transmission and the UL transmission is variable and it is dependent on the used LBT scheme. Thus, the gap may be shorter than one subframe and it may last for a few subframes if the channel is occupied by other Radio Access Technologies (RATs) or nodes which may use the channel for another MCOT time.

In such a case, the serving node may estimate the gap between DL transmission and UL transmission and the at least two modes for the UL scheduling may be further based on the estimated gap. The gap can be estimated in various ways, for example based on channel occupation status. As an example, durations for historical CCA or eCCA can be used as a reference. In embodiments of the present disclosure. The gap may be considered in determining the scheduling mode, for example, the at least two modes for the UL scheduling can be determined by adding a number of subframes in the gap to the required time delay. In some embodiments of the present disclosure, the at least two modes for the UL scheduling can be determined by using the latest Q DL subframes to schedule all UL subframes if the number of subframes in the gap is smaller than the required time delay, wherein Q is the difference between the number of subframes in the gap and the required time delay. In some other embodiments of the present disclosure, the at least two modes for the UL scheduling can be determined by using the last DL subframe to schedule all UL subframes.

Hereinafter, reference will be made to FIGS. 12 to 18 to describe the scheduling scheme wherein the modes for the UL scheduling are further based on the estimated gap. It shall be noted that the gap between the DL and the UL burst is assumed as at least T subframes, the DL burst can end at a slot boundary and the UL burst can start at a predetermined symbol, and if partial subframe transmission is allowed, the total gap may be T subframes+partial subframe, but the scheduling timing can still be counted with T for purpose of illustration, although it is possible to count the scheduling time as T subframes+partial subframe. In addition, for a purpose of illustration simplification, in FIGS. 12 to 18, the transmission will be illustrated as starting and ending at the subframe boundary. Furthermore, it shall also be noted that the scheduling schemes can also be feasible for cases described with FIGS. 4 to 11 if there is a longer gap between DL and UL bursts.

In some embodiments of the present disclosure, at least T subframes are estimated as unavailable subframes, all schemes as illustrated in FIGS. 2 to 11 can applied by adding T subframes into the scheduling time delay. That is to say, n+k can be changed as n+k+T, n+2k can be changed as n+k+T, n+k+m' can be changed as n+k+T+m', and so on, for examples, as illustrated in FIGS. 12 and 13.

Figure 12:
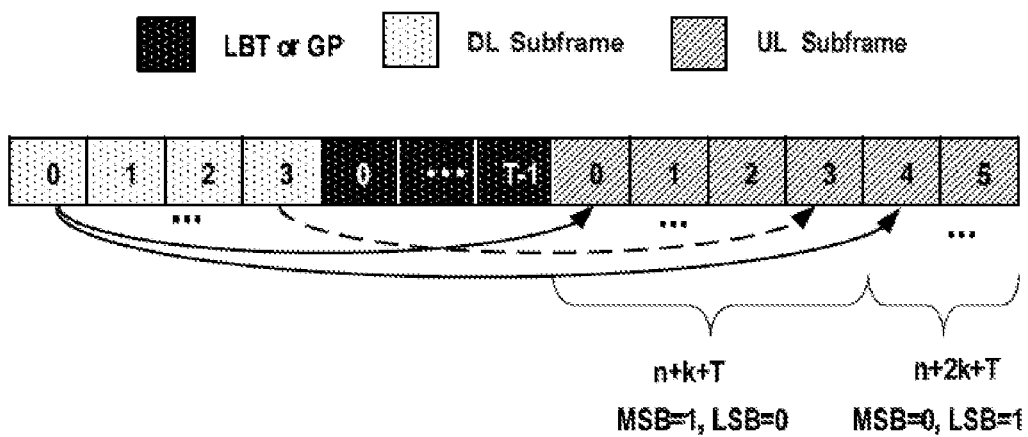
FIG. 12 schematically illustrates an example scheduling scheme in a case that a gap between DL transmission and UL transmission is considered in accordance with an embodiment of the present disclosure.

FIG. 12 illustrates an example scheduling scheme in a case that a gap between DL transmission and UL transmission is considered and the different scheduling modes are used by different terminal devices in accordance with an embodiment of the present disclosure. As illustrated in FIG. 12, the first four UL subframes can be scheduled in a n+k+T mode which is obtained by adding T to n+k, the last two UL subframes can be scheduled in a n+2k+T mode, which is obtained by adding T to n+2k. In addition, it is clear that the n+2k+T mode can also be replaced by a n+k+T+m' mode which may be obtained by adding T to n+k+m'.

Figure 13:
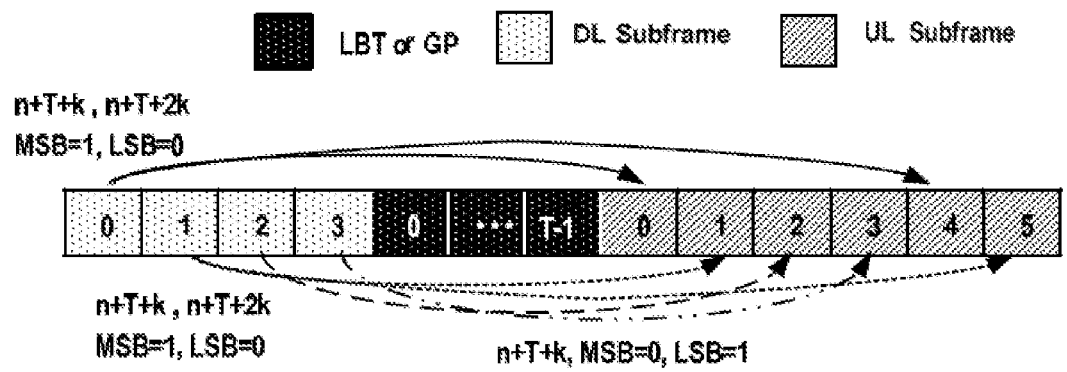
FIG. 13 schematically illustrates an example scheduling scheme in a case that a gap between DL transmission and UL transmission is considered in accordance with another embodiment of the present disclosure.

FIG. 13 illustrates an example scheduling scheme in a case that a gap between DL transmission and UL transmission is considered and the multi-subframe scheduling is supported, in accordance with another embodiment of the present disclosure. Similarly to those illustrated in FIG. 12, in FIG. 13, DL subframe 0 is used to send a UL grant for scheduling UL subframe 0 and 4 and DL subframe 1 is used to send UL grant for scheduling UL subframe 1 and 5 in a n+k+T mode and in a n+2k+T mode which are obtained by adding T to n+k and n+2k respectively; DL subframes 2 and 3 are used to send UL grants for scheduling subframes 2 and 3 respectively in a n+T+k mode which is obtained by adding T to n+k. In addition, it is clear that the n+2k+T mode can also be replaced by a n+k+T+m' mode which may be obtained by adding T to n+k+m'.

In embodiments of the present disclosure, in a case that T is shorter than K, it is possible to take T into account of the required time delay k. In such case, the UL subframes can be scheduled by last k−T subframe in the DL burst, as illustrated in FIGS. 14 to 17.

Figure 14:
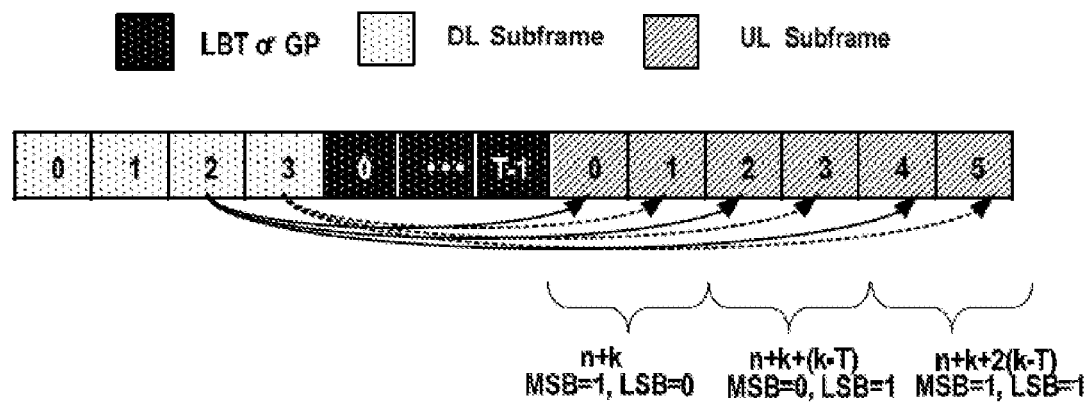
FIG. 14 schematically illustrates an example scheduling scheme in a case that a gap between DL transmission and UL transmission is considered in accordance with a further embodiment of the present disclosure.

As illustrated in FIG. 14, the UL subframes can be scheduled by the last two DL subframes in a n+k mode, a n+k+(k−T) mode, and a n+k+2(k−T) mode, and the three modes can be used by three terminal devices. Particularly, DL subframe 2 is used to send UL grants for UL subframes 0, 2, 4 and DL subframe 3 is used to send UL grants for UL subframes 1, 3, 5 and thus, the UL subframe 0 and 1 are scheduling in the n+k mode, the UL subframe 2 and 3 are scheduling in the n+k+(k−T) mode, and the UL subframe 4 and 5 are scheduling in the n+k+2(k−T) mode.

Figure 15:
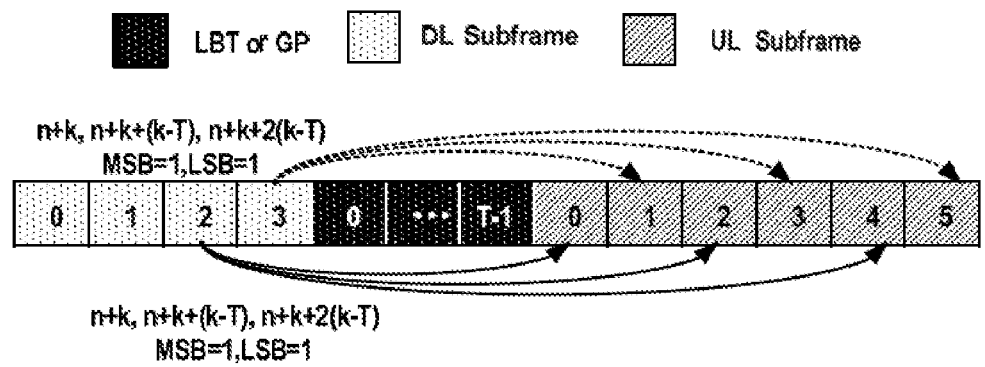
FIG. 15 schematically illustrates an example scheduling scheme in a case that a gap between DL transmission and UL transmission is considered in accordance with a still further embodiment of the present disclosure.

FIG. 15 schematically illustrates another example scheduling scheme in accordance with another embodiment of the present disclosure. As illustrated in FIG. 15, the UL subframes can be scheduled by the last two DL subframes in a combination mode of n+k mode, a n+k+(k−T) mode, and a n+k+2(k−T). The combination mode can be used by a single terminal device or two different terminal devices. Thus, DL subframe 2 is used to send a single UL grant for scheduling UL subframes 0, 2 and 4, and subframe 3 is used to send a single UL grant for scheduling UL subframes 1, 3 and 5.

It shall be noted that, in a case there are more UL subframes than those illustrated in FIGS. 14 and 15, it is also possible to further use n+k+3(k−T), n+k+4(k−T) and so on.

Figure 16:
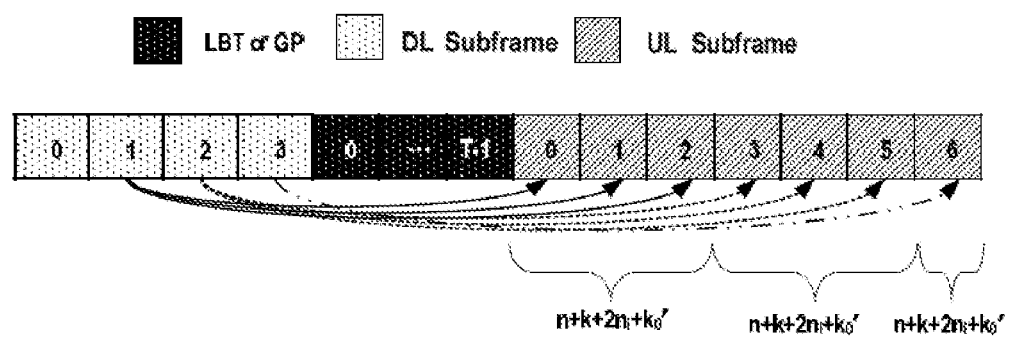
FIG. 16 schematically illustrates an example scheduling scheme in a case that a gap between DL transmission and UL transmission is considered in accordance with a yet further embodiment of the present disclosure.
Figure 17:
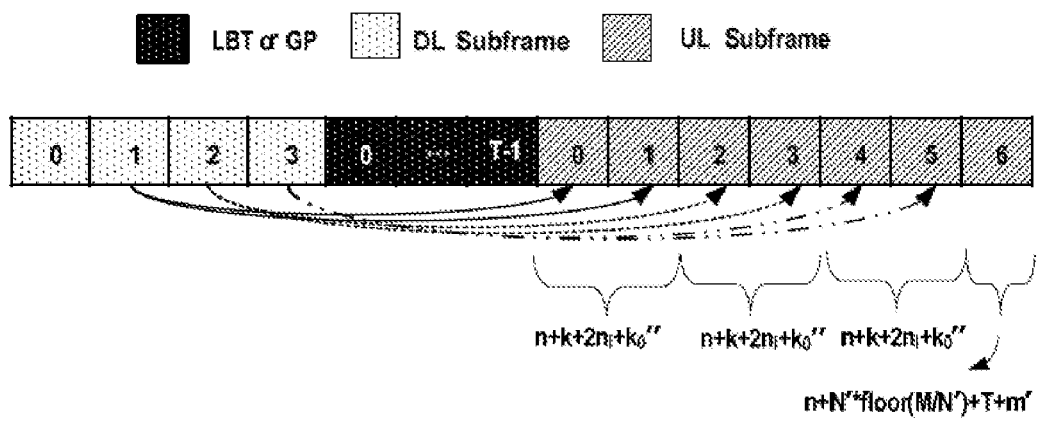
FIG. 17 schematically illustrates an example scheduling scheme in a case that a gap between DL transmission and UL transmission is considered in accordance with another embodiment of the present disclosure.

FIGS. 16 and 17 schematically illustrate further example scheduling schemes in accordance with further embodiments of the present disclosure. The scheduling schemes are similar to those illustrated in FIGS. 10 and 11 except that the last K−T DL subframes in the DL burst are used to send UL grant for the UL subframes and $k_0'$ and $k_0''$ are used in FIGS. 16 and 17, wherein $k_0'=0, 1, \ldots \text{floor}(M/(N'))$, and $k_0''=0, 1, \ldots \text{floor}(M/(N'))-1$ but now N' is equal to k−T instead of N or k.

Figure 18:
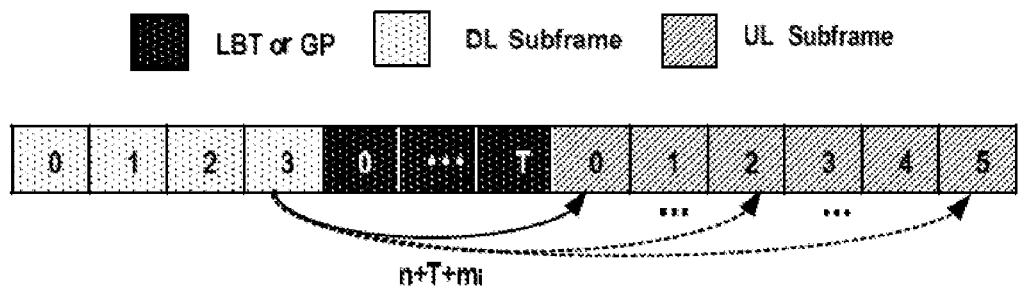
FIG. 18 schematically illustrates an example scheduling scheme in a case that a gap between DL transmission and UL transmission is considered in accordance with a further embodiment of the present disclosure.

Additionally, if T>=k and T can be taken into account for the required time delay k, that is to say, it may consider using the last one DL subframe to scheduling all the UL subframes in the UL burst as illustrated in FIG. 18, wherein the UL subframes are scheduled in a $n+T+m_i$. Besides, in such a case, it is also possible to use the scheduling scheme as illustrated in FIG. 12 or 13, i.e., adding T to the scheduling time delay directly.

Hereinbefore, embodiments are described as the Chanel is available just at the first scheduled UL subframe. However, it can be understood that in real UL transmission, there might be a case wherein the channel is available after the UL burst or before the UL burst, and in such a case, there might be potential problems. For example, if the channel is available before the UL burst, there might two possible options. In one option, the terminal device can wait until the scheduled subframe is arrived, and then transmit as scheduled, in such a case it may allow the channel to be occupied by other RATS and nodes during the waiting time. As another option, the channel is not allowed to be occupied by other RATS and nodes during the waiting time and the terminal device may send a reservation signal to reserve the channel, which means a channel resource waste. In such a case, the terminal device may perform the UL transmission as scheduled, i.e., the terminal device will actually occupy the clear channel before the UL burst and the scheduled UL subframes, more UL subframes than scheduled, but there is a possibility that the UL transmission exceed the MCOT. Or alternatively, the UE can only transmission in allowed time period to meet the MCOT and thus the terminal device needs to know the expected transmission duration or MCOT and monitor the start of the transmission and take the reservation signal into account. On the other hand, if the channel is after the UL burst, the UL burst may postpone for a certain time, the previous sent UL grants may not cover the whole UL burst and in such a case, if the terminal device performs the UL transmission as scheduled, it means less efficient transmission.

In view of this, the method may further comprise transmitting a transmission duration indication which indicates an allowed UL transmission duration as illustrated in step 140 in FIG. 1. As mentioned hereinabove, in real UL transmission, there might be a case wherein the channel is available after the UL burst or before the UL burst, and thus there might be potential problems such as resource wastes, less efficient transmission, etc. In such a case, it will be advantageous if an additional UL subframe is granted so that more subframes than required can be used in the UL transmission to guarantee efficient transmission time in the UL transmission.

Figure 19:
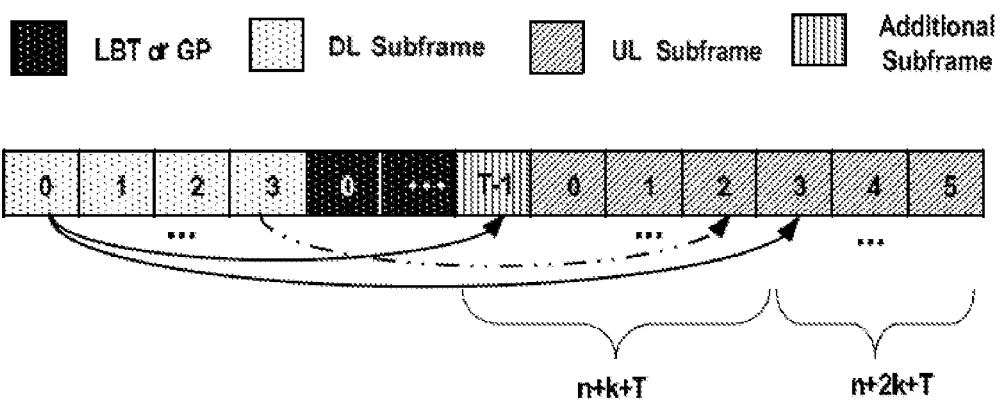
FIG. 19 schematically illustrates an example scheduling scheme in a case that the channel is available prior to the estimated gap in accordance with an embodiment of the present disclosure.

FIG. 19 schematically illustrates an example scheduling scheme in a case that the channel is available before the estimated gap T in accordance with an embodiment of the present disclosure. As illustrated in FIG. 19, if the channel is available before the UL burst, an additional UL subframe can be scheduled, which is located immediately before the UL subframes that would have been used for the UL transmission, i.e., before the UL scheduled burst. In such a case, the serving node such as eNB sends enough UL grants more than required, e.g. UL grants for the UL burst and subframe 0-5. In such a way, the efficient transmission time can be guaranteed. On the other hand, it is preferable if the terminal knows the expected transmission duration or MCOT since the terminal device can monitor the start of the transmission and transmits accordingly within the UL MCOT. By this means, it may ensure that the expected transmission duration or MCOT is not exceeded. The expected information may be sent by DCI format 1C, for example. In addition, it is clear that the n+2k+T mode can also be replaced by a n+k+T+m' mode.

Figure 20:
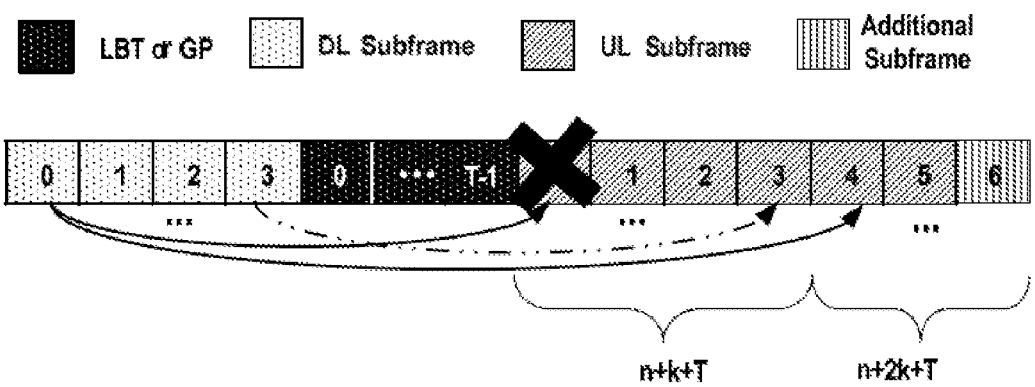
FIG. 20 schematically illustrates an example scheduling scheme in a case that the channel is available after the estimated gap in accordance with another embodiment of the present disclosure.
Figure 21:
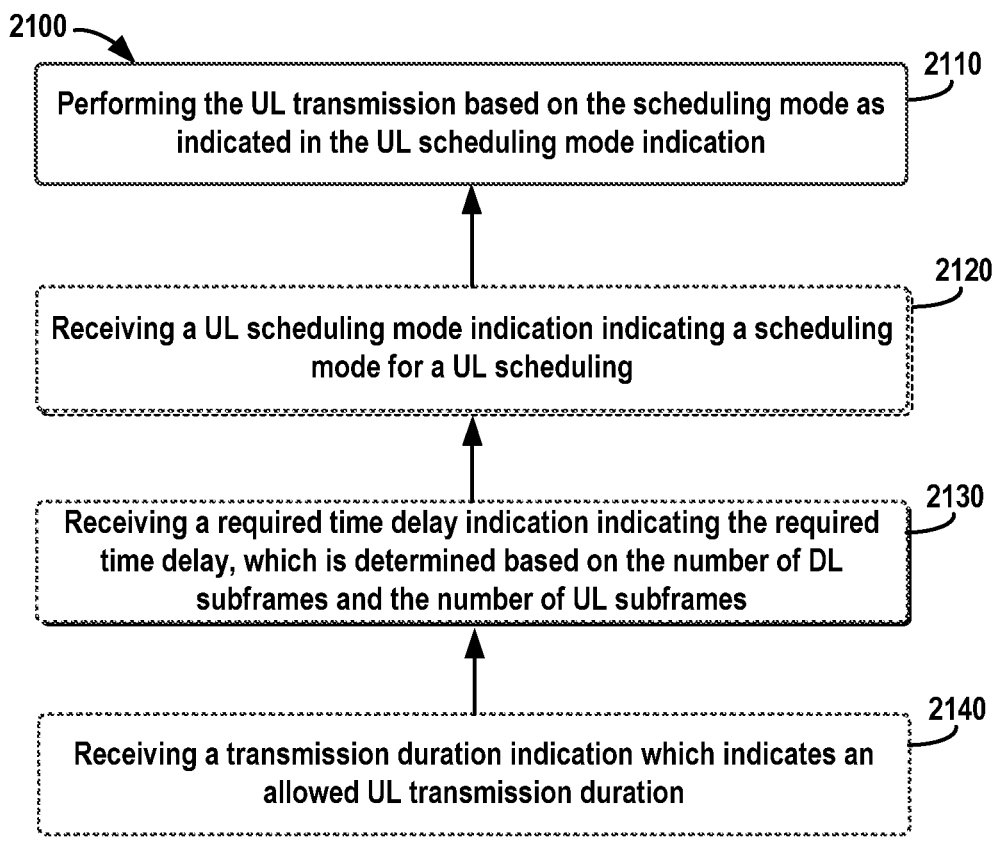
FIG. 21 schematically illustrates a flow chart of a method 2100 of performing UL transmission in accordance with an embodiment of the present disclosure.

FIG. 20 schematically illustrates an example scheduling scheme in a case that the channel is available after the estimated gap in accordance with an embodiment of the present disclosure. As illustrated in FIG. 20, if the channel is available after the UL burst, the additional UL subframe is scheduled, which is located immediately after the UL subframes that would have been used for the UL transmission, i.e., after the UL scheduled burst. Thus, in such a case, the serving node such as eNB sends enough UL grants more than required, e.g. UL grants for subframes 0 to 6. In such a way, the efficient transmission time can be guaranteed. In the meanwhile, it is preferable if the terminal knows the expected transmission duration or MCOT since the terminal device can monitor the start of the transmission and transmits accordingly within the UL MCOT. By this means, it may ensure that the expected transmission duration or MCOT is not exceeded. Similarly, the expected information may be sent by DCI format 1C, for example. In addition, it is clear that the n+2k+T mode can also be replaced by a n+k+T+m' mode It shall be appreciated that FIG. 20 and FIG. 21 are only presented to describe two ways of scheduling addition subframes and the ways of scheduling addition subframes are not limited to the illustrated scheduling schemes but can be applied to any of scheduling schemes as provided herein, for example those as illustrated in FIGS. 2 to 18. In addition, it can also be understood that the granted additional UL subframe can be more than one subframe, which is dependent on when the channel is available. It can further be understood that the granted additional UL subframe can also include a partial subframe if the partial subframe transmission which allows the UL transmissoin to start and/or end at a partial subframe is enabled.

It can be appreciated that for the scheduling schemes described with reference to FIGS. 12 to 18, the scheduling mode indication can be similar to those in FIGS. 4 to 8 and the only difference lies in that the scheduling delay time or the scheduling timing is modified.

Particularly, for the embodiment wherein a number T of subframes in the gap is added to the required time delay k, like those illustrated in FIGS. 12 and 13, it may be used similar indicator to indicate different modified scheduling modes. For the embodiments described with reference to FIGS. 14 to 15, indicator 10 may be used for n+k, indicator 01 may be used for n+k+(k−T), indicator 11 may be used for n+k+2(k−T); or alternatively, indicator 11 may be used for n+k, n+k+(k−T), and n+k+2(k−T); in addition, it is also possible to use any other possible combination of two bits to indicate these scheduling modes. Besides, for the scheduling schemes as illustrated in FIGS. 16 and 17, the indicators can be exactly similar to those in FIGS. 10 and 11.

It shall be noted that steps 120 to 140 can be performed in any suitable manners and they are limited to the illustrated sequences; instead, they may performed in different orders from those illustrated or it may be performed simultaneously.

FIG. 21 further schematically illustrates a flow chart of a method 2100 of performing UL transmission in accordance with an embodiment of the present disclosure. In accordance with embodiments of the present disclosure, the method 2000 can be performed at the terminal device such as UE or any other suitable devices.

As illustrated in FIG. 21, the method 2100 starts from step 2110, in which the UL transmission is performed based on a scheduling mode for a UL scheduling. The scheduling mode can be a predetermined scheduling mode or a scheduling mode indicated in a UL scheduling mode indication. In a case, the scheduling mode is a predetermined scheduling mode or the scheduling mode is specific to subframe structure, no mode indication is needed.

On the other hand, if the scheduling modes are determined by the serving modes eNB in real time, the serving mode may send a UL scheduling mode indication to the terminal device. Thus, in step 2120, the method 2100 may further comprises receiving the UL scheduling mode indication indicating the scheduling mode for the UL scheduling. In such a case, the UL scheduling mode can be received in various ways. For example, the UL scheduling mode indication may be received by means of a UL index in downlink control information format or alternatively by means of additional bits in the downlink control information format.

In embodiments of the present disclosure, in the UL scheduling, different terminal devices can use different scheduling modes with different scheduling delay time delays. In other embodiments of the present disclosure, in the UL scheduling, a single terminal device can use different scheduling modes with different scheduling time delays.

In embodiments of the present disclosure, the different scheduling time delays can be determined at least based on a required time delay k between a UL grant and the UL transmission. The required time delay k can be a fixed value. Or alternatively, it can be variable value which is determined based on the number of DL subframes and the number of UL subframe. In such a case, in step S2130, the method 2100 may further comprise receiving a required time delay indication indicating the required time delay k.

In another embodiment of the present disclosure, the different scheduling time delays can be selected from any of the required time delay k between the UL grant and the UL transmission; a multiple of the required time delay k; the required time delay k and a predetermined extension value; another multiple of the required time delay k; a multiple of the required time delay k and a predetermined extension time value; and a combination of time delays, which comprises a required time delay k and two or more variable extension values, so that subframes in the UL transmission are scheduled as most as possible.

In embodiments of the present disclosure, the different scheduling modes can be further determined based on a gap between DL transmission and UL transmission.

In embodiments of the present discource, the different scheduling modes can be further determined at least by any one of: adding a number of subframes in the gap to the required time delay; using the latest Q DL subframes to schedule all UL subframes if the number of subframes in the gap is smaller than the required time delay, wherein Q is the difference between the number of subframes in the gap and the required time delay; and using the last DL subframe to schedule all UL subframes.

In embodiments of the present disclosure, an additional UL subframe is granted so that more subframes than required can be used in the UL transmission to guarantee efficient transmission time. In such a case, at step 2140, the method 2100 may further comprise receiving a transmission duration indication which indicates an allowed UL transmission duration, wherein the UL transmission is performed in the allowed UL transmission duration. The addition UL subframe is located immediately before or immediately after the UL subframes that would have been used for the UL transmission.

It shall be noted that, similar to those steps 120 to 140 in FIG. 1, steps 2120 to 2140 can be performed in any suitable manners and they are limited to the illustrated sequences; instead, they may performed in different orders from those illustrated or it may be performed simultaneously.

Figure 22:
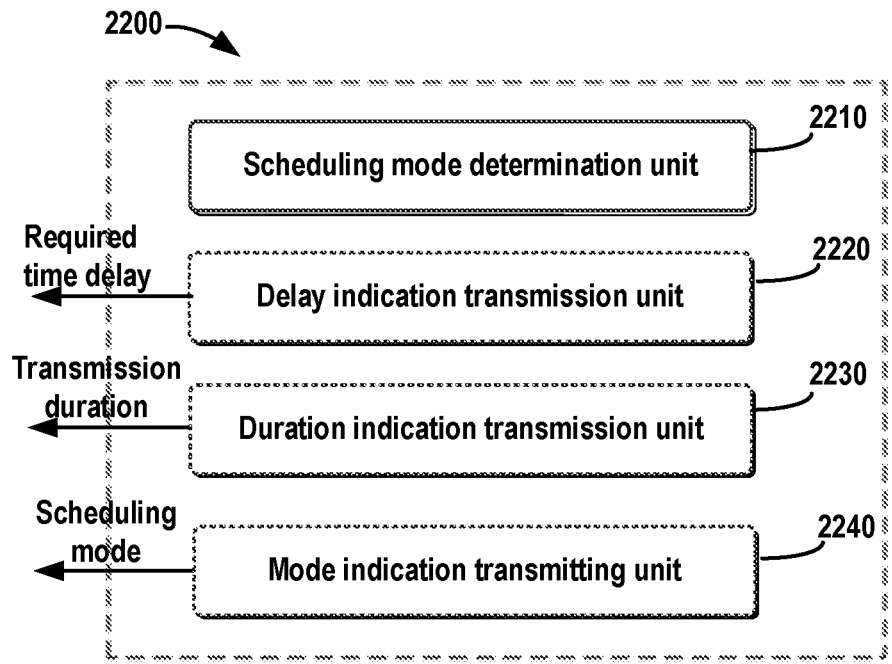
FIG. 22 schematically illustrates a block diagram of an apparatus 2200 for performing UL scheduling in accordance with an embodiment of the present disclosure.

FIG. 22 schematically illustrates a block diagram of an apparatus 2200 for performing UL scheduling in accordance with an embodiment of the present disclosure. In accordance with embodiments of the present disclosure, the apparatus 2200 can be implemented at a serving node like eNB, or any other suitable devices.

In embodiments of the present disclosure, the apparatus 2200 may comprise a scheduling mode determination unit 2210. The scheduling mode determination 2210 may be configured to determine at least two modes for the UL scheduling based on the number of DL subframes and the number of UL subframes, wherein the at least two modes indicate different scheduling time delays.

In embodiments of the present disclosure, the different scheduling time delays can be determined at least based on a required time delay between a UL grant and the UL transmission.

In embodiments of the present disclosure, the required time delay can be determined based on the number of DL subframes and the number of UL subframes.

In embodiments of the present disclosure, the method may further comprise a delay indication transmission unit 2220, which can be configured to transmit a required time delay indication indicating the required time delay.

In embodiments of the present disclosure, the at least two modes can be used for different terminal devices. Or alternatively, the at least two modes are used for a single terminal device.

In embodiments of the present disclosure, the different scheduling time delays can be determined so that subframes in the UL transmission are scheduled as most as possible. The different scheduling time delays can be selected from any of: a required time delay between a UL grant and the UL transmission; a multiple of the required time delay; the required time delay and a predetermined extension value; another multiple of the required time delay; a multiple of the required time delay and a predetermined extension time value; and a combination of time delays, which comprises a required time delay and two or more variable extension values.

In embodiments of the present disclosure, the at least two modes for the UL scheduling can be further determined based on a gap between DL transmission and UL transmission.

In embodiments of the present disclosure, the at least two modes for the UL scheduling can be determined at least by any one of: adding a number of subframes in the gap to the required time delay; using the latest Q DL subframes to schedule all UL subframes if the number of subframes in the gap is smaller than the required time delay, wherein Q is the difference between the number of subframes in the gap and the required time delay; and using the last DL subframe to schedule all UL subframes.

In embodiments of the present disclosure, the apparatus may further comprise a duration indication transmission unit 2230. The duration indication transmission unit 2330 may be configured to transmit a transmission duration indication which indicates an allowed UL transmission duration. In such a case, an additional UL subframe is granted so that more subframes than required can be used in the UL transmission to guarantee efficient transmission time in the UL transmission. In embodiments of the present disclosure, the additional UL subframe can be located immediately before or immediately after the UL subframes that would have been used for the UL transmission.

In embodiments of the present disclosure, apparatus 2200 can further comprise a mode indication transmitting unit 2240. The mode indication transmitting unit 2240 can be configured to transmit a UL scheduling mode indication indicating the at least two modes for the UL scheduling. The mode indication transmitting unit 2240 can be configured to transmit the UL scheduling mode indication in many different ways. For example, the UL scheduling mode indication is transmitted by reusing a UL index in downlink control information format. As another example, the UL scheduling mode indication can be transmitted by using additional bits in the downlink control information format.

Figure 23:
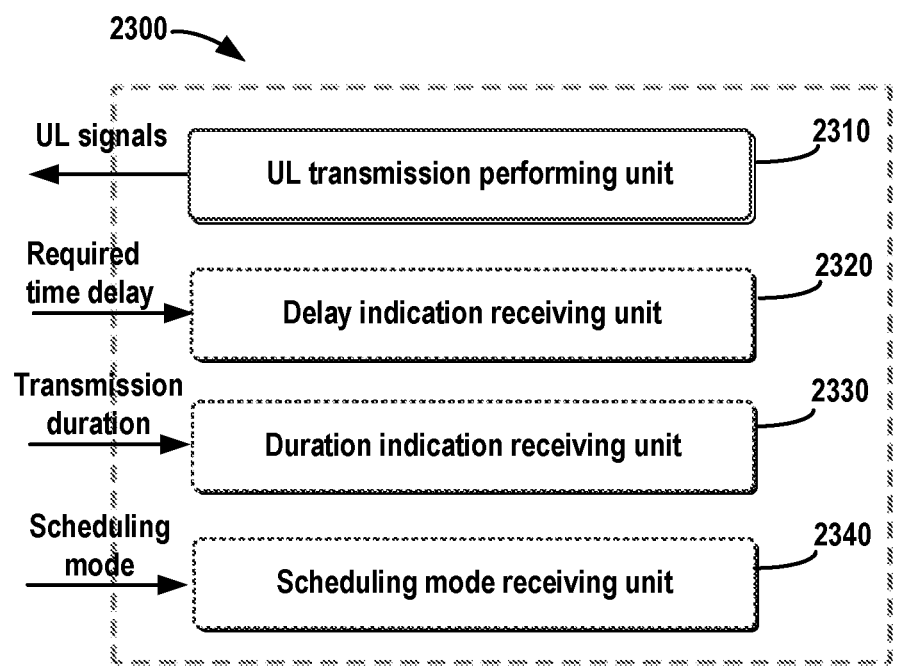
FIG. 23 schematically illustrates a block diagram of an apparatus 2300 for performing UL transmission in accordance with an embodiment of the present disclosure.

FIG. 23 schematically illustrates a block diagram of an apparatus 2300 for performing UL transmission in accordance with an embodiment of the present disclosure. The apparatus 2300 may be implemented at the terminal device such as UE or any other suitable devices.

As illustrated in FIG. 23, the apparatus 2300 may comprise a UL transmission performing unit 2310. The UL transmission performing unit 2310 can be configured to perform the UL transmission based on a scheduling mode for a UL scheduling, wherein the scheduling mode is a predetermined scheduling mode or a scheduling mode indicated in a UL scheduling mode indication.

In embodiments of the present disclosure, in the UL scheduling, different terminal devices can use different scheduling modes with different scheduling delay time delays.

In embodiments of the present disclosure, in the UL scheduling, a single terminal device can also use different scheduling modes with different scheduling time delays used by a single terminal device.

In embodiments of the present disclosure, the different scheduling time delays can be determined at least based on a required time delay between a UL grant and the UL transmission.

In embodiments of the present disclosure, the apparatus 2300 may further comprise: a delay indication receiving unit 2320. The delay indication receiving unit 2320 can be configured to receive a required time delay indication indicating the required time delay, which is determined based on the number of DL subframes and the number of UL subframes.

In embodiments of the present disclosure, the different scheduling time delays can be selected from any of a required time delay between the UL grant and the UL transmission; a multiple of the required time delay; the required time delay and a predetermined extension value; another multiple of the required time delay; a multiple of the required time delay and a predetermined extension time value; and a combination of time delays, which comprises a required time delay and two or more variable extension values, so that subframes in the UL transmission are scheduled as most as possible.

In embodiments of the present disclosure, the different scheduling modes can be further determined based on a gap between DL transmission and UL transmission. For example, the different scheduling modes are further determined at least by any of: adding a number of subframes in the gap to the required time delay; using the latest Q DL subframes to schedule all UL subframes if the number of subframes in the gap is smaller than the required time delay, wherein Q is the difference between the number of subframes in the gap and the required time delay; and using the last DL subframe to schedule all UL subframes.

In embodiments of the present disclosure, the apparatus may further comprise a duration indication receiving unit 2330. The duration indication receiving unit 2330 may be configured to receive a transmission duration indication which indicates an allowed UL transmission duration, wherein an additional UL subframe is granted so that more subframes than required can be used in the UL transmission to guarantee efficient transmission time, and wherein the UL transmission is performed in the allowed UL transmission duration.

In some embodiments of the present disclosure, the addition UL subframe can be located immediately before the UL subframes that would have been used for the UL transmission. In other embodiments of the present disclosure, the addition UL subframe can be located immediately after the UL subframes that would have been used for the UL transmission.

In embodiments of the present disclosure, the apparatus 2300 may further comprise: a scheduling mode receiving unit 2340. The scheduling mode receiving unit 2340 can be configured to receive a UL scheduling mode indication indicating the scheduling mode for the UL scheduling. In embodiments of the present disclosure, the UL scheduling mode indication can be received in many different manners. For example, the UL scheduling mode indication can be received by means of a UL index in downlink control information format. Or alternatively, the UL scheduling mode indication can be received by means of additional bits in the downlink control information format.

Hereinbefore, the apparatuses 2200 and 2300 are described in brief with reference to FIGS. 22 and 23. It is noted that the apparatuses 2200 and 2300 may be configured to implement functionalities as described with reference to FIGS. 1 to 21. Therefore, for details about the operations of modules in these apparatuses, one may refer to those descriptions made with respect to the respective steps of the methods with reference to FIGS. 1 to 21.

It is further noted that the components of the apparatuses 2200 and 2300 may be embodied in hardware, software, firmware, and/or any combination thereof. For example, the components of apparatuses 2200 and 2300 may be respectively implemented by a circuit, a processor or any other appropriate selection device. In addition, those skilled in the art will appreciate that the aforesaid examples are only for illustration not for limitation and the present disclosure is not limited thereto; one can readily conceive many variations, additions, deletions and modifications from the teaching provided herein and all these variations, additions, deletions and modifications fall the protection scope of the present disclosure.

Additionally, in some embodiment of the present disclosure, apparatuses 2200 and 2300 may comprise at least one processor. The at least one processor suitable for use with embodiments of the present disclosure may include, by way of example, both general and special purpose processors already known or developed in the future. Apparatuses 2200 and 2300 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 2200 and 2300 to at least perform operations according to the method as discussed with reference to FIGS. 1 to 21 respectively.

Figure 24:
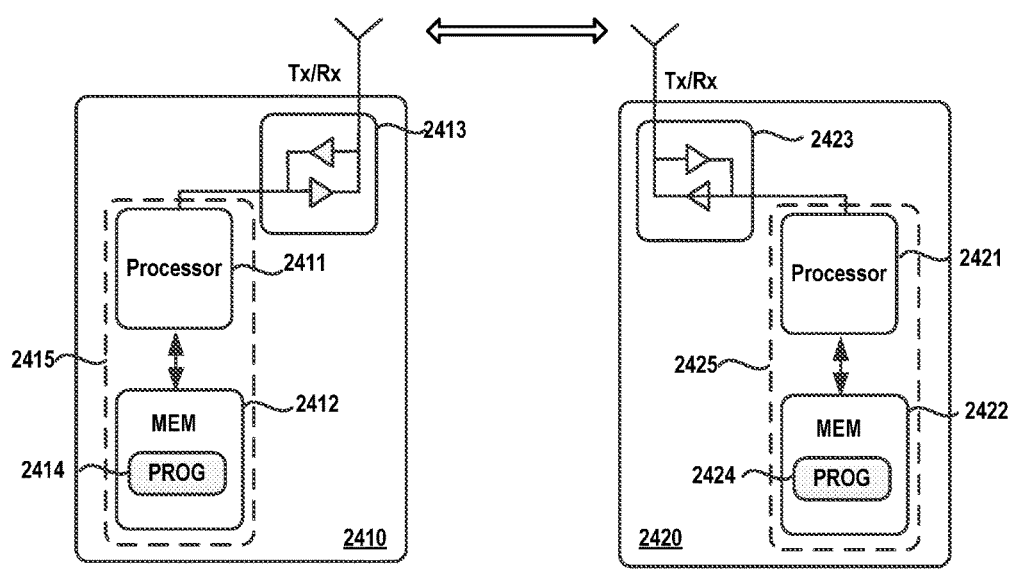
FIG. 24 further illustrates a simplified block diagram of an apparatus 2410 that may be embodied as or comprised in UE and an apparatus 2320 that may be embodied as or comprised in a base station in a wireless network as described herein.

FIG. 24 further illustrates a simplified block diagram of an apparatus 2410 that may be embodied as or comprised in a terminal device such as UE for a wireless network in a wireless network and an apparatus 2420 that may be embodied as or comprised in a base station such as NB or eNB as described herein.

The apparatus 2410 comprises at least one processor 2411, such as a data processor (DP) and at least one memory (MEM) 2412 coupled to the processor 2411. The apparatus 2410 may further comprise a transmitter TX and receiver RX 2413 coupled to the processor 2411, which may be operable to communicatively connect to the apparatus 2420. The MEM 2412 stores a program (PROG) 2414. The PROG 2414 may include instructions that, when executed on the associated processor 2411, enable the apparatus 2410 to operate in accordance with the embodiments of the present disclosure, for example to perform the method 2100. A combination of the at least one processor 2411 and the at least one MEM 2412 may form processing means 2415 adapted to implement various embodiments of the present disclosure.

The apparatus 2420 comprises at least one processor 2421, such as a DP, and at least one MEM 2422 coupled to the processor 2421. The apparatus 2420 may further comprise a suitable TX/RX 2423 coupled to the processor 2421, which may be operable for wireless communication with the apparatus 2410. The MEM 2422 stores a PROG 2424. The PROG 2424 may include instructions that, when executed on the associated processor 2421, enable the apparatus 2420 to operate in accordance with the embodiments of the present disclosure, for example to perform the method 100. A combination of the at least one processor 2421 and the at least one MEM 2422 may form processing means 2425 adapted to implement various embodiments of the present disclosure.

Various embodiments of the present disclosure may be implemented by computer program executable by one or more of the processors 2411, 2421, software, firmware, hardware or in a combination thereof.

The MEMs 2412 and 2422 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 2411 and 2411 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a user equipment (UE), the method comprising:
receiving, from a base station in subframe n, an information for scheduling Physical Uplink Shared Channel (PUSCH) in each of multiple subframes in an unlicensed spectrum, the information indicating a first parameter, wherein
in a case where the first parameter indicates a first value, an offset from the subframe n is equal to a predefined value which is equal to four, and
in a case where the first parameter indicates a second value, the offset from the subframe n is a third value based on a fourth value determined by the base station; and
performing a corresponding PUSCH transmission in the multiple subframes based on the offset.

2. The method of claim 1, wherein the PUSCH transmission is conditioned on channel access procedures.

3. The method of claim 1, wherein the PUSCH transmission starts within a symbol of a subframe.

4. The method of claim 3, wherein the multiple subframes comprise one or more consecutive subframes.

5. A method performed by a base station, the method comprising:
transmitting, to a user equipment (UE), in subframe n, an information for scheduling Physical Uplink Shared Channel (PUSCH) in each of multiple subframes in an unlicensed spectrum, the information indicating a first parameter, wherein in a case where the first parameter indicates a first value, an offset from the subframe n is equal to a predefined value which is equal to four, and in a case where the first parameter indicates a second value, the offset from the subframe n is a third value based on a fourth value determined by the base station; and
receiving a corresponding PUSCH transmission in subframes corresponding to the number of scheduled subframes, based on the offset.

6. The method of claim 5, wherein the PUSCH transmission is conditioned on channel access procedures.

7. The method of claim 5, wherein the PUSCH transmission starts within a symbol of a subframe.

8. The method of claim 5, wherein the multiple subframes comprise one or more consecutive subframes.

9. A user equipment (UE) comprising a transceiver configured to:
receive from a base station in subframe n, an information for scheduling Physical Uplink Shared Channel (PUSCH) in each of multiple subframes in an unlicensed spectrum, the information indicating a first parameter, wherein in a case where the first parameter indicates a first value, an offset from the subframe n is equal to a predefined value which is equal to four, and in a case where the first parameter indicates a second value, the offset from the subframe n is a third value based on a fourth value determined by the base station; and
perform a corresponding PUSCH transmission in the multiple subframes based on the offset.

10. The UE of claim 9, wherein the PUSCH transmission is conditioned on channel access procedures.

11. The UE of claim 9, wherein the PUSCH transmission starts within a symbol of a subframe.

12. The UE of claim 9, wherein the multiple subframes comprise one or more consecutive subframes.

* * * * *

UNITED STATES PATENT AND TRADEMARK OFFICE
CERTIFICATE OF CORRECTION

PATENT NO. : 10,880,908 B2  
APPLICATION NO. : 15/758962  
DATED : December 29, 2020  
INVENTOR(S) : Lei Jiang, Hongmei Liu and Gang Wang Page 1 of 1

It is certified that error appears in the above-identified patent and that said Letters Patent is hereby corrected as shown below:

In the Specification

Column 12, Line 25; Delete "$n+k+n_{il+k''}$" and insert --$n+k+n_i+k$"-- therefor Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*